This invention relates to a tool for deburring, chamfering, back spot-facing, grooving, and performing similar operations. The application may be considered as a continuation-in-part of my prior application Serial No. 8,695, filed Feb. 15, 1960.

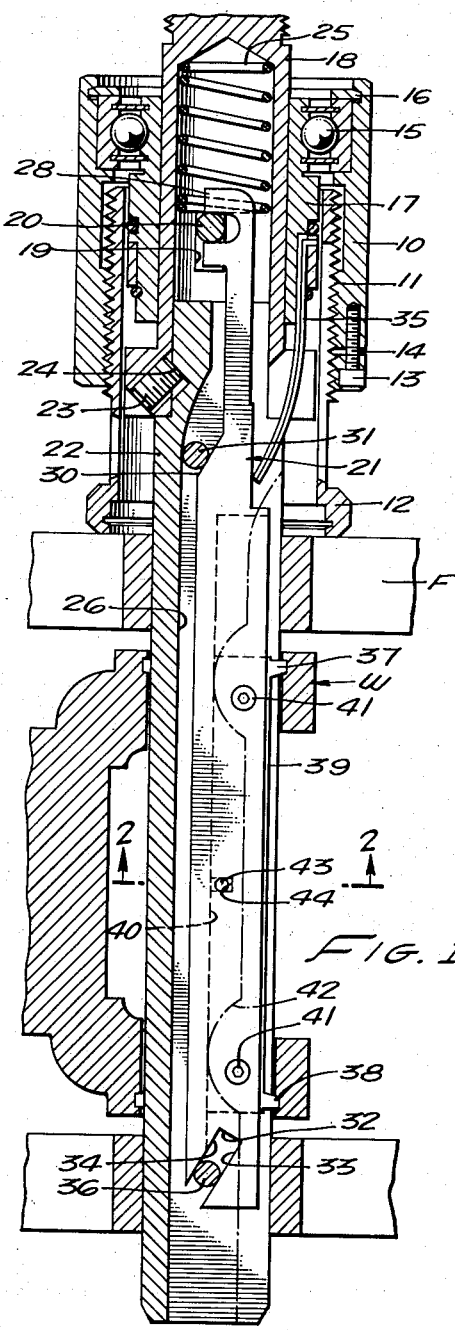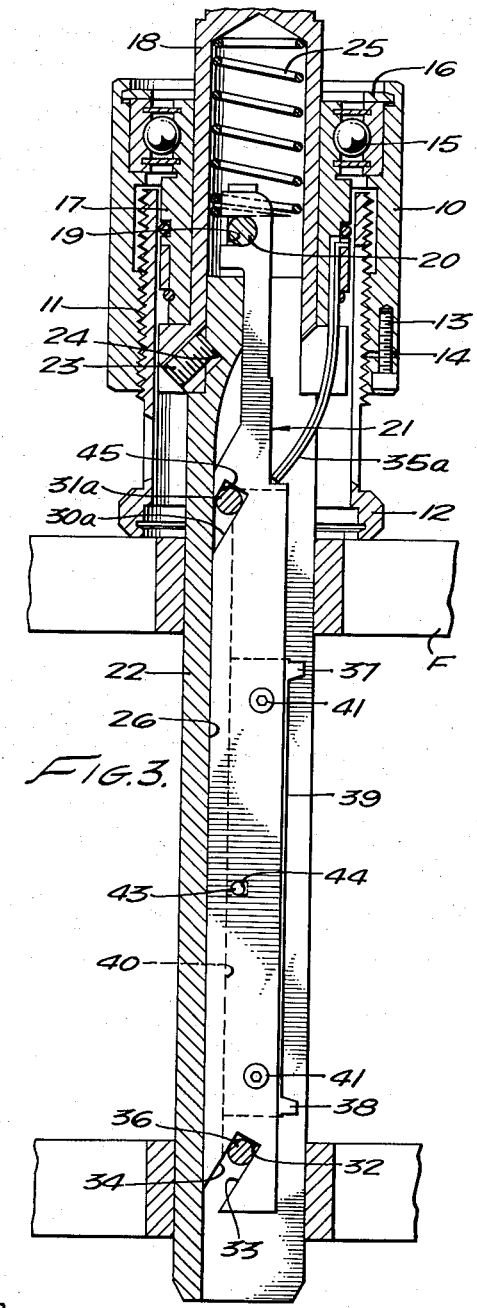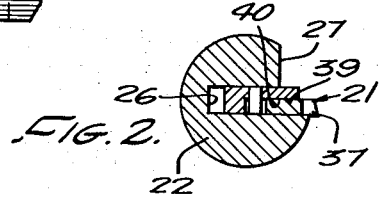
INVENTOR.
JOSEPH W. FRIED
BY Hazard & Miller
ATTORNEYS 3,037,406
TOOL FOR DEBURRING, CHAMFERING, BACK SPOT-FACING, GROOVING, ETC.
Joseph W. Fried, 6860 Farmdale Ave., North Hollywood, Calif.
Filed May 22, 1961, Ser. No. 111,725
7 Claims. (Cl. 77—58)

In the above-mentioned application a tool is disclosed for performing these operations which consists essentially of an adjustable workface-engaging means within which a spindle and a detachable pilot are mounted for rotation and axial movement. A cutter is normally disposed within the pilot but can be cammed outwardly therefrom to effect a cut on the work when the spindle and pilot are moved axially relative to the workface-engaging means. In the construction disclosed in my prior application the cutter is mounted so as to be capable of rotating within the workface-engaging means but has its longitudinal movement relative to the workface-engaging means arrested. This cutter is mounted on a substantially diametrically extending pin by means of an open-sided hook or crotch. This enables the cutter to swing about the pin as a center when it is cammed into cutting position. The open-sided hook or crotch enables quick detachment of the cutter from the pin when the pilot is detached from the spindle so that the cutter and/or the pilot can be easily and quickly replaced.

With the cutter thus mounted for swinging movement on the pin the cutter pivots about the pin as a center. For some operations, however, it is desirable that the cutter instead of swinging into the work in the course of making a cut should instead have its movements restricted to linear movements in a direction absolutely perpendicular to the axis of rotation of the pilot. For certain purposes, if the cutter is restricted to horizontal movements as distinguished from swinging movements more precise cutting operations can be obtained.

One object of the present invention is to provide a construction having the above-mentioned characteristics wherein the cutter will have its movements restricted to linear movements perpendicular to the axis of rotation of the pilot as distinguished from swinging movements as in the construction disclosed in my prior application.

Another criticism of the tool disclosed in my prior application is that reactionary forces imparted to the cutter during cutting may be such as to cause the cutter to work or pivot in the tool in an objectionable manner. Sometimes this ability results in objectionable chattering. It is, therefore, another object of the present invention to provide a construction wherein the cutter is not only advanced against the work in a linear manner as distinguished from a swinging movement, but the design is such that reactionary forces will not cause the cutter to pivot or to shift from its intended position.

Still another object of the invention is to provide a tool of this character wherein the cutter has a detachable and replaceable blade, and to provide means for accurately locating the blade with relation to the cutter when one blade is substituted for another.

With the foregoing and other objects in view, which will be made manifest in the following detailed description and specifically pointed out in the appended claims, reference is had to the acccompanying drawings for an illustrative embodiment of the invention, wherein:

FIGURE 1 is a vertical section through one form of tool embodying the present invention, the cutter being shown in its advanced position;

FIG. 2 is a horizontal section taken upon the line 2—2 upon FIG. 1; and

FIG. 3 is a view similar to FIG. 1, but illustrating an alternative form of construction the cutter being shown in retracted position.

Referring to the accompanying drawings wherein similar reference characters designate similar parts throughout, the tool embodying the present invention comprises a generally cylindrical body 10 within which there is threadedly mounted as by threads 11 a workface-engaging skirt 12. The position of adjustment of the skirt 12 relative to the body 10 can be fixed or locked by means of a screw 13 that extends across a slot 14 in the body. By tightening the screw 13 that portion of the body that is below the slot 14 will be caused to tighten against threads 11 to lock the skirt 12 in adjusted position.

In the top of the body 10 there is preferably an antifriction ball bearing 15 retained in place by a snap ring 16, and this ball bearing serves to rotatably mount within the body a sleeve 17. This sleeve, while it is freely rotatable within the body, is held against axial movement therein by reason of the ball bearing.

In the sleeve 17 there is disposed a hollow spindle 18 having vertical slots 19 formed in the walls thereof approximately on a diameter of the spindle. A pin 20 extends across the spindle through the slots 19 and has its ends anchored in the sleeve 17. This pin serves to suspend the cutter generally indicated at 21.

In the lower end of the spindle 18 there is telescoped the upper end of a generally cylindrical pilot 22. This pilot is detachably mounted in the spindle by means of a set screw 23 that is threaded into the spindle and engages a shoulder 24 on the pilot.

The spindle 18 is vertically slidable within the sleeve 17 within the limits afforded by the ends of the slots 19 through which the pin 20 extends. Consequently both the spindle 18 and its attached pilot 22 are not only rotatable within the workface-engaging means provided by the body 10 and skirt 12, but they are also axially movable therein within the limits permitted by the slots 19.

A coil compression spring 25 is disposed within the hollow spindle and is seated on the pin 20. This compression spring urges the spindle and the pilot into their uppermost positions.

As shown in FIG. 2, the pilot is longitudinally grooved as at 26 to receive the cutter 21. One side of the pilot may be removed as at 27 to provide a chipthroat for cuttings that are cut by cutters from the work.

The upper end of the cutter is formed with an open-sided hook or horizontally facing crotch 28, the opposed sides of which closely fit and bear against the top and bottom of the pin 20. Consequently, although the cutter may rotate with the spindle 18 and the pilot 22 within the body 10 the cutter has its longitudinal movement prevented or arrested by virtue of the fact that it engages snugly the pin 20 which is mounted on the sleeve 17 which, in turn, is held against axial movement relative to the body 10.

In the construction disclosed in my prior patent a similar open-sided hook or crotch is employed to mount the cutter, but in that construction the cutter in the course of being advanced toward the work pivoted or swung about the pin 20 as a center. Such an arrangement was subject to the criticisms heretofore mentioned. In the present construction the cutter, instead of pivoting or swinging about the pin 20 as a center is caused to move in a horizontal direction or in a direction perfectly perpendicular to the axis of rotation of the spindle 18 and the pilot 22. To this end, the upper end of the cutter has its back formed with an inclined camming surface 30 engageable by a pin 31 that extends across the groove 26. The lower end of the cutter is similarly provided with an inclined slot 32 which provides a camming surface 33 which will cam the cutter toward the work and a second camming surface 34 which will cam the lower end of the cutter into retracted position. The two camming surfaces 30 and 33 are parallel to each other and are preferably arranged at spaced points along the length of the cutter 21 and on opposite sides of the cutting edges. 35 is a leaf spring mounted on the sleeve 17 bearing against the upper end of the cutter 21 and urging it into engagement with the pin 31.

With the construction as above described the workface-engaging means either engages the face of the work to be actuated upon or the face of a work-supporting fixture F in which the work W is rigidly mounted. When a fixture F is employed it temporarily becomes a part of the work and provides the face against which the skirt 12 engages. If no fixture F is employed the skirt 12 may engage directly against the top face of the work. Such engagement whether with the work W or with the fixture F locates the longitudinal position of the pin 20 with respect to the work and location of this pin precisely locates the position of the cutter and of the cutting edges thereon. If the spindle 18, in the course of its rotation, is axially forced downward it moves the pilot 22 downward also. This causes the pins 31 and 36 to move downward while in engagement with the camming surfaces 30 and 33, respectively. As these camming surfaces are spaced from each other and are parallel, the downward movement of the pilot causes the cutter 21 to be advanced in a horizontal linear direction therein its open-sided hook or crotch slides relatively to the pin 20 instead of pivoting or swinging thereon, compare the position of the cutter shown in FIG. 3 with the position of the cutter shown in FIG. 1. With such a movement the cutting edges on the cutter advance in a truly horizontal direction toward the work as distinguished from swinging into the work about the pin 20 as a center as in my prior application. When the spindle and pilot are elevated by the spring 25 the pins 31 and 36 rise and allow the cutter 21 to retract. In the construction shown in FIG. 1, the upper end of the cutter is retracted by the spring 35. The lower end of the cutter is forcibly retracted by reason of the pin 36 engaging the cam 34. Consequently, with the improved construction as the cutter has its movements restricted to truly horizontal movements as distinguished from arcuate or swinging movements, more precise operations are possible. Furthermore, as the camming surfaces 30 and 33 are longitudinally spaced from each other along the length of the cutter and are preferably on opposite sides of the cutting edges, reactionary forces from the cutting will not cause the cutter to tilt within the pilot.

By way of illustration, the cutting edges on the cutter are shown as being two in number, indicated at 37 and 38. These cutting edges are provided by a replaceable blade 39 occupying a rebate 40 in the side of the cutter 21. The blade is detachably mounted on the cutter, such as by Allen set screws 41 whose heads are movable through arcuate cutout portions 42 in one side of the pilot in one side of the groove 26. The set screws 41 extend through the blade and are threaded into the body of the cutter 21.

In order to accurately position the blade longitudinally with respect to the cutter a pin 43 extends across the slot 26 in the pilot and a slot 44 is formed in the back of the blade which closely fits the pin 43. Consequently, whenever occasion requires to remove a blade and its replacement with another blade having a similar accurately located slot 44 this can be accomplished very readily by removing the set screws 41 withdrawing the blade and replacing it with another blade. The substituted blade on engaging the pin 43 will have the position of its cutting edges 37 and 38 or other cutting edges accurately located with respect to the pin 20 whose position is located in reference to the workface by the skirt 12.

The construction illustrated in FIG. 3 is the same as that previously described except that the pin 31a corresponding to the pin 31 engages not only the camming surface 30a in the course of advancing the cutter but is also engageable with a camming surface 45 to forcibly retract the cutter when the spindle and pilot are permitted to rise relative to the workface-engaging means 10 and skirt 12. In this form of construction the leaf spring 35a may or may not be employed as its presence is not necessary due to the presence of the retracting camming surface 45.

From the above-described construction it will be appreciated that in the improved tool the cutter, instead of being permitted to swing about the pin 20 toward the work is cammed toward the work in a truly horizontal direction, the axis of rotation of the spindle 18 and of the pilot being considered as vertical. Furthermore, as the cutter is cammed toward the work at two spaced points that are spaced from each other longitudinally of the cutter and are preferably located on opposite sides of the cutting edges 37 and 38, reactionary forces imparted to the cutters in the course of cutting are incapable of tilting the cutter 21 within the pilot. These advantages are present in conjunction with the advantage of being able to completely replace the pilot 22 and the cutter 21 whenever occasion requires. This is accomplished by merely removing set screw 23 and sliding the pilot downwardly relative to the cutter 21. With the pilot removed the cutter 21 can be axially turned so that its open-sided hook or crotch will disengage the pin 20. When the pin 20 has been disengaged the cutter can be bodily removed. A replacing cutter can be installed in the reverse manner.

The present construction is highly advantageous over the construction illustrated in FIGS. 10, 11, and 12 of my copending application above identified, wherein the cutter is caused to be advanced toward the work by the descending pilot by reason of a single inclined surface engagement between the cutter and the pilot. Such a construction has the limitation that it is not suitable for use with pilots of considerable length, pilots of small diameter, or where it is desired to establish a specific rate of cutter projection with respect to longitudinal feed of the tool spindle. In the present construction as the cutter has two spaced points of engagement with the pilot these limitations are overcome and danger of the cutter rocking or swinging relatively to the pilot under reactionary or other extraneous forces is eliminated. Furthermore, although I have illustrated the cutter as being confined in its movement to a direction perpendicular to the axis of rotation of the pilot because of the horizontal engagement with the pin from which the cutter is suspended, it will be appreciated that if the engagement with the pin is inclined at other than 90° to the axis of rotation of the pilot that the cutter may be caused to follow a path other than horizontal for under-cutting purposes, and the like.

Various changes may be made in the details of construction without departing from the spirit and scope of the invention as defined by the appended claims.

I claim:

1. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, and means restricting the cutter to movements perpendicular to the axis of rotation of the pilot when the pilot is moved axially relative to the workface-engageable means.

2. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, and means at upper and lower points on the cutter for restricting the cutter to movements perpendicular to the axis of the pilot relatively to the pilot when the pilot is moved axially relative to the workface-engageable means.

3. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, one or more cutting edges on the cutter, and means above and below the cutting edges for causing the cutter to move laterally when the pilot is moved axially relative to the workface-engageable means.

4. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, means for camming the cutter outwardly relative to the pilot when the pilot is moved downwardly relative to the workface-engageable means, and means for camming the cutter inwardly when the pilot is moved upwardly relative to the workface-engageable means.

5. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, means forming an oblique pin and slot connection between the cutter and the pilot wherein the opposed sides of the slot closely embrace the pin for camming the cutter outwardly of the pilot when the pilot is moved downwardly relative to the workface-engageable means and camming it inwardly when the pilot is moved in the opposite direction.

6. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, and means restricting the cutter to movements perpendicular to the axis of rotation of the pilot when the pilot is moved axially relative to the workface-engageable means, the cutting edges of the cutter being provided by a blade detachably mounted thereon.

7. A device of the class described comprising workface-engaging means, a pilot means mounting the pilot on the workface-engaging means for axial movement and rotation relatively thereto, a cutter normally disposed within the pilot, means restraining the cutter against longitudinal movement relative to the workface-engageable means, and means restricting the cutter to movements perpendicular to the axis of rotation of the pilot when the pilot is moved axially relative to the workface-engageable means, the cutting edge of the cutter being provided by a blade detachably mounted thereon and restricted in its movements relatively thereto to a direction perpendicular to the axis of the pilot.

References Cited in the file of this patent
UNITED STATES PATENTS
2,207,067    Patscheider _____ July 9, 1940

OTHER REFERENCES

Winterhalter: German application Ser. No. B25376 16/49a, printed Dec. 6, 1956 (Kl 49a 56 02), 3 pages spec., 3 sheets drawings.